(12) United States Patent
Pearson

(10) Patent No.: US 8,268,276 B2
(45) Date of Patent: Sep. 18, 2012

(54) METHOD AND SYSTEM FOR REDUCING LIME CONSUMPTION IN DRY FLUE GAS DESULFURIZATION SYSTEMS

(75) Inventor: Thomas Edwin Pearson, Knoxville, TN (US)

(73) Assignee: ALSTOM Technology Ltd, Baden (CH)

(*) Notice: Subject to any disclaimer, the term of this patent is extended or adjusted under 35 U.S.C. 154(b) by 0 days.

(21) Appl. No.: 12/898,938

(22) Filed: Oct. 6, 2010

(65) Prior Publication Data

US 2012/0087852 A1    Apr. 12, 2012

(51) Int. Cl.
*B01D 53/50* (2006.01)
*B01D 53/80* (2006.01)

(52) U.S. Cl. ............ 423/243.08; 423/244.07; 422/168; 422/177

(58) Field of Classification Search ............ 423/243.08, 423/244.07; 422/168, 177
See application file for complete search history.

(56) References Cited

U.S. PATENT DOCUMENTS

| | | | |
|---|---|---|---|
| 4,197,278 A * | 4/1980 | Gehri et al. | 423/243.08 |
| 4,246,242 A * | 1/1981 | Butler et al. | 423/210 |
| 4,324,770 A | 4/1982 | Bakke | |
| 4,756,892 A * | 7/1988 | Kragh et al. | 423/244.08 |
| 5,270,015 A | 12/1993 | Rochelle et al. | |
| 5,795,548 A * | 8/1998 | Madden et al. | 422/171 |
| 5,814,288 A | 9/1998 | Madden et al. | |
| 7,625,537 B2 * | 12/2009 | Rader et al. | 423/210 |

FOREIGN PATENT DOCUMENTS

| | | |
|---|---|---|
| DE | 195 14 135 | 4/1995 |
| WO | WO 94/07591 A1 * | 4/1994 |

OTHER PUBLICATIONS

PCT International Search Report and Written Opinion of the International Searching Authority, PCT/US2011/054565, dated Dec. 5, 2011.

* cited by examiner

*Primary Examiner* — Timothy Vanoy
(74) *Attorney, Agent, or Firm* — Rita D. Vacca

(57) ABSTRACT

In a method for reducing lime consumption in DFGD systems, a slaker is provided wherein lime and water is introduced to produce a slaked lime slurry. The slurry is introduced into a spray dryer wherein the slurry is atomized. A flue gas stream is also introduced into the spray dryer and reacts with the atomized slurry, causing calcium sulfate and sulfite, as well as unreacted lime particulate to form. A portion of the particulate is filtered and sent back in a substantially dry form to the slaker to form part of the slurry.

10 Claims, 4 Drawing Sheets

METHOD AND SYSTEM FOR REDUCING LIME CONSUMPTION IN DRY FLUE GAS DESULFURIZATION SYSTEMS

FIELD

The disclosure herein relates generally to dry flue gas desulfurization, and more particularly to a method and system whereby recycle material, including unreacted lime, is introduced back into the system.

BACKGROUND

Dry flue gas desulfurization (DFGD) covers a range of technologies that include the absorption of sulfur dioxide ($SO_2$) by reaction with alkaline materials. These materials can be dry particles, dry particles in a humid environment, or moist particles in the process of drying. The absorption of $SO_2$ with moist particles is typically accomplished using a spray dryer.

Spray drying is a DFGD process where a lime slurry is prepared by slaking lime. The slaked lime is usually stored in a tank and then transferred to the spray dryer. A spray dryer is a large, empty vessel where flue gas is directed at high velocity toward lime slurry atomizers. The atomizer uses high energy to divide the slurry into extremely fine droplets and dispense them into the high velocity gas stream. The result is three activities that occur at essentially the same time, albeit incompletely. Sulfur dioxide is absorbed into the droplets, the sulfur dioxide reacts with the lime to form a mixture of calcium sulfite and calcium sulfate, and the droplet dries leaving the reaction products suspended in the gas. Historically, the resulting particulates are carried out of the spray dryer with the flue gas for separation and disposal.

DFGD systems that only use fresh lime (often referred to a "once-through lime") use a large quantity of lime as compared to DFGD systems that recycle at least a portion of lime already used in the system. However, known lime recycle systems are expensive and time consuming because of the need to combine the used lime with dilution water. A system that reduces fresh lime consumption while also reducing cost and time in lime recycling is desired.

SUMMARY

In one aspect disclosed herein there is provided a method for reducing lime consumption in DFGD systems that includes introducing lime and water into a slaker to produce a slaked lime slurry. The slaked lime slurry is subsequently introduced into a spray dryer where prior to the introduction of the slurry into the spray dryer, water is added to the slurry. Once introduced into the spray dryer, the slurry is atomized. A flue gas stream is also introduced into the spray dryer and reacts with the atomized slaked lime slurry. This reaction causes sulfur dioxide in the flue gas to be absorbed into droplets that form part of the atomized slurry. The sulfur dioxide reacts with the slaked lime in the slurry to form calcium sulfite and calcium sulfate particulate.

At least a portion of the flue gas and the particulate are transferred from the spray dryer to a filter wherein at least a portion of the particulate is separated from the flue gas. The separated particulate is substantially dry. At least a portion of the substantially dry particulate separated in the filter, which also contains some unreacted lime, is transferred back to the slaker where it is mixed with the water and lime during a slaking operation, thereby forming part of the slaked lime slurry.

The above described and other features are exemplified by the following figures and detailed description.

BRIEF DESCRIPTION OF THE DRAWINGS

Referring now to the figures, which are exemplary embodiments, and wherein the like elements are number alike.

DETAILED DESCRIPTION

Figure 1:
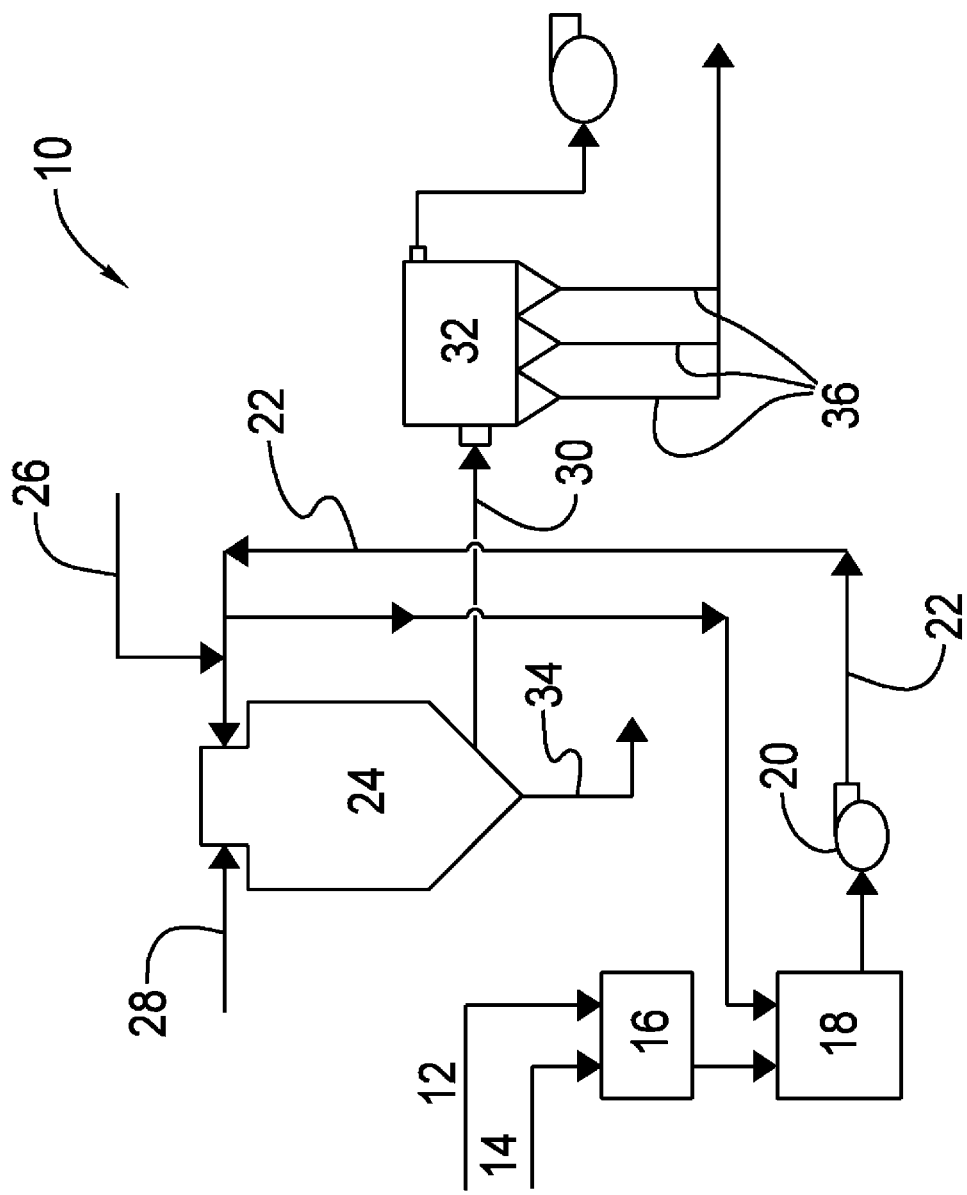
FIG. 1 schematically illustrates a DFGD system.

A general DFGD system is shown in FIG. 1 and generally designated by the reference number 10. Water and lime are fed via conduits 12 and 14 respectively, into a slaker 16 where a slaking operation is performed. From the slaker 16, the slaked lime slurry flows into a tank 18 for storage. The slaked lime slurry is pumped, via pump 20 through conduit 22 to a spray dryer 24. Prior to entering the spray dryer 24 additional water can be added to the slaked lime slurry via conduit 26. A flue gas stream 28 is also fed into the spray dryer 24. Inside the spray dryer 24, the slaked lime slurry is atomized and comes into contact with the flue gas stream where it reacts therewith in the above-described manner. Particulate and flue gas exit the spray dryer 24 via conduit 30 and are collected by a filter 32. A portion of the particulate also exits the spray dryer 24 via conduit 34 for disposal. Particulate is separated from the flue gas in the filter 32 and exits therefrom via conduits 36 for subsequent disposal.

Figure 2:
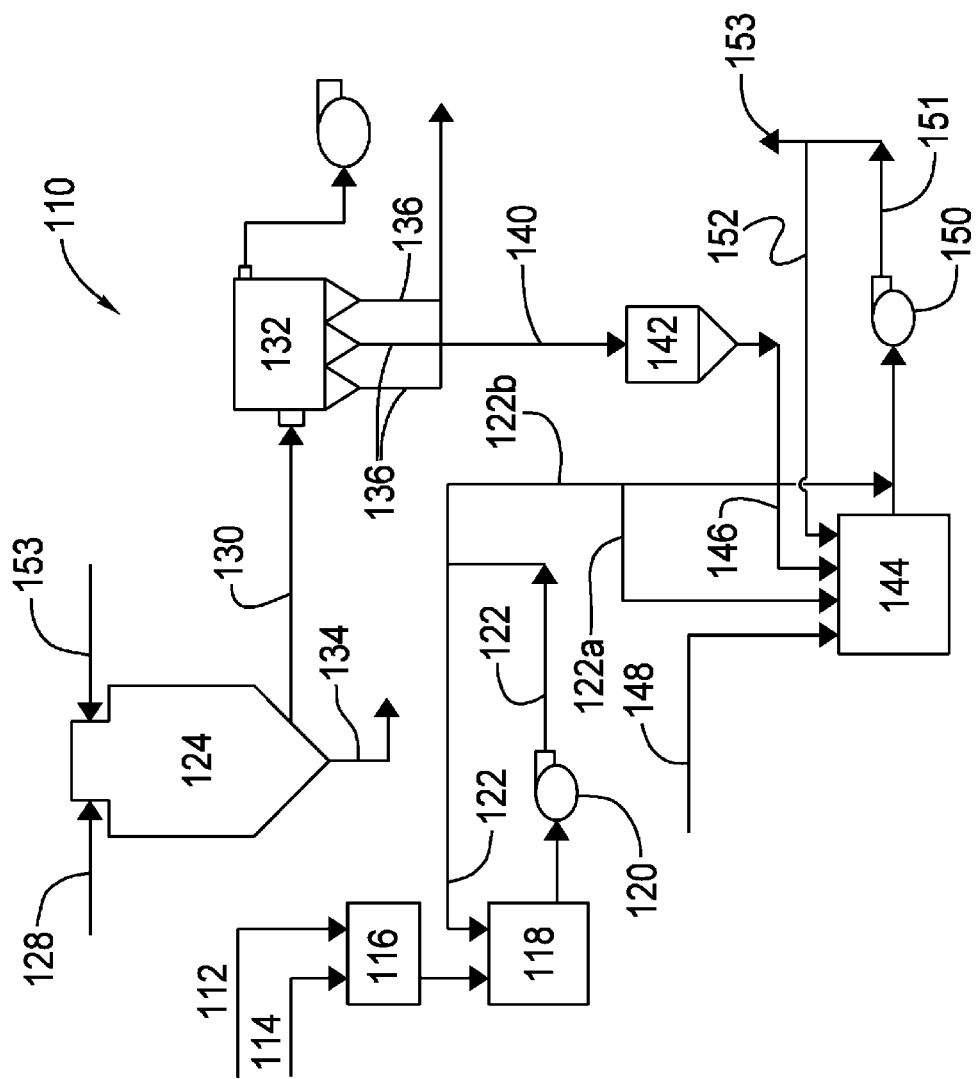
FIG. 2 schematically illustrates a DFGD system.

Another DFGD system is shown in FIG. 2 and is generally designated by the reference number 110. DFGD system 110 is similar to the above-described system 10 with like elements being identified with like reference numbers preceded by the numeral 1. One difference between systems 10 and 110 is that not all of the particulate collected by the filter 132 is disposed. At least a portion of the particulate separated by the filter 132 is transferred via conduit 140 into a storage silo 142. The particulate is then transferred to a feed tank 144 via conduit 146. Water is added to the feed tank 144 via conduit 148. Additionally, a portion of the slaked lime slurry from pump 120 is provided to the feed tank 144 via a conduit 122a. The mixture of slaked lime slurry, water and particulate exit the feed tank 144 where additional slaked lime slurry may be added via a conduit 122b prior to introduction to a pump 150. The mixture exits the pump 150 in a conduit 151, where a portion of the mixture is provided to the feed tank 144 via a conduit 152, and the remaining mixture of slaked lime slurry, water and particulate is provided to the spray dryer 124 via a conduit 153.

Figure 3:
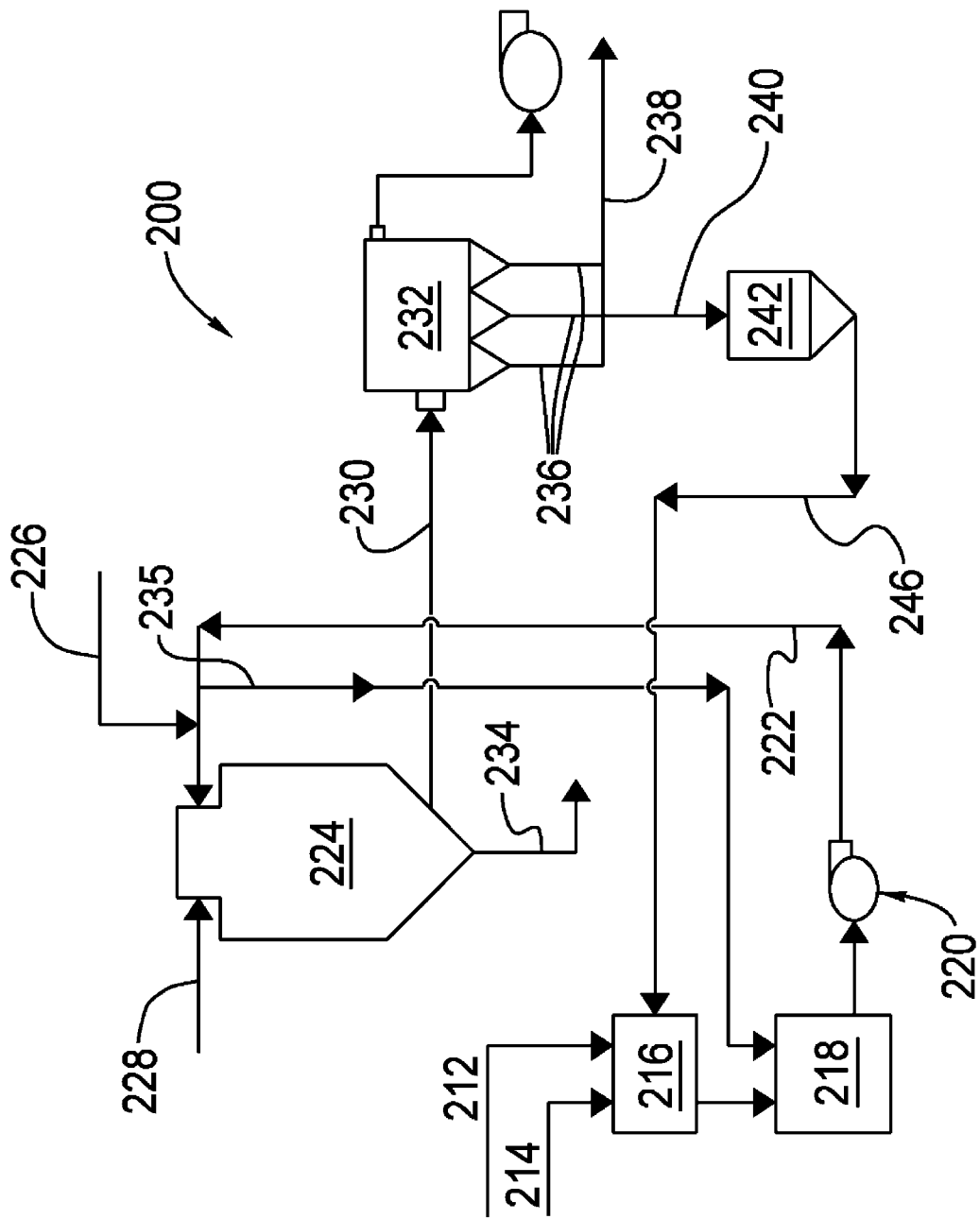
FIG. 3 schematically illustrates a DFGD system.

As shown in FIG. 3, a DFGD system generally designated by the reference number 200 includes conduits 212 and 214 that feed water and lime into a lime slaker 216 where a slaking operation is performed. From the slaker 216, the slaked lime slurry flows into a tank 218 for storage. The slaked lime slurry is pumped, via pump 220 and conduit 222 to a spray dryer 224.

Prior to entering the spray dryer 224 additional water can be added to the slaked lime slurry via conduit 226. A flue gas stream 228 is also fed into the spray dryer 224. The flue gas 228 is produced by combustion of a fuel in a boiler (not shown), which may be, for example, a circulating fluidized bed boiler (CFB boiler).

Inside the spray dryer 224, the slaked lime slurry is atomized and comes into contact with the flue gas stream where it reacts therewith in the above-described manner. Particulate and flue gas exit the spray dryer 224 via conduit 230 and flow into a filter 232. A portion of the particulate also exits the spray dryer 224 via conduit 234 for disposal. Excess slurry is recycled back to the tank 218 prior to entering the spray dryer 224 via conduit 235.

Particulate is separated from the flue gas 228 in the filter 232. The separated particulate exits the filter 232 via conduits 236 with a portion of the filtered particulate going to disposal via conduit 238 and another portion of the particulate being transferred via conduit 240 to a storage receptacle, which in the illustrated embodiment is shown as a storage silo 242. The particulate, which contains unreacted lime, is transferred via conduit 246 from the storage silo 242, back to the slaker 216 where the particulate is mixed with the water and lime feed during a slaking operation. The particulate from the storage silo is used to form the slurry that is fed via conduit 222 to the spray dryer 224.

Combustion of certain types of coals, such as, for example, Power River Basin (PRB) coal, produce particulates in the flue gas 228 including, for example, CaO (lime), $Na_2O$, $K_2O$ and MgO. These particulates, when added to the slaker 216, convert to hydroxides, which react with $SO_2$, thereby reducing the amount of fresh lime consumed in the slaker. Use of a CFB boiler produces a flue gas 228 having particulates that are rich in CaO. These particulates, when added to the slaker 216, convert to calcium hydroxide, which reacts with $SO_2$, thereby reducing the amount of fresh lime consumed in the slaker.

Figure 4:
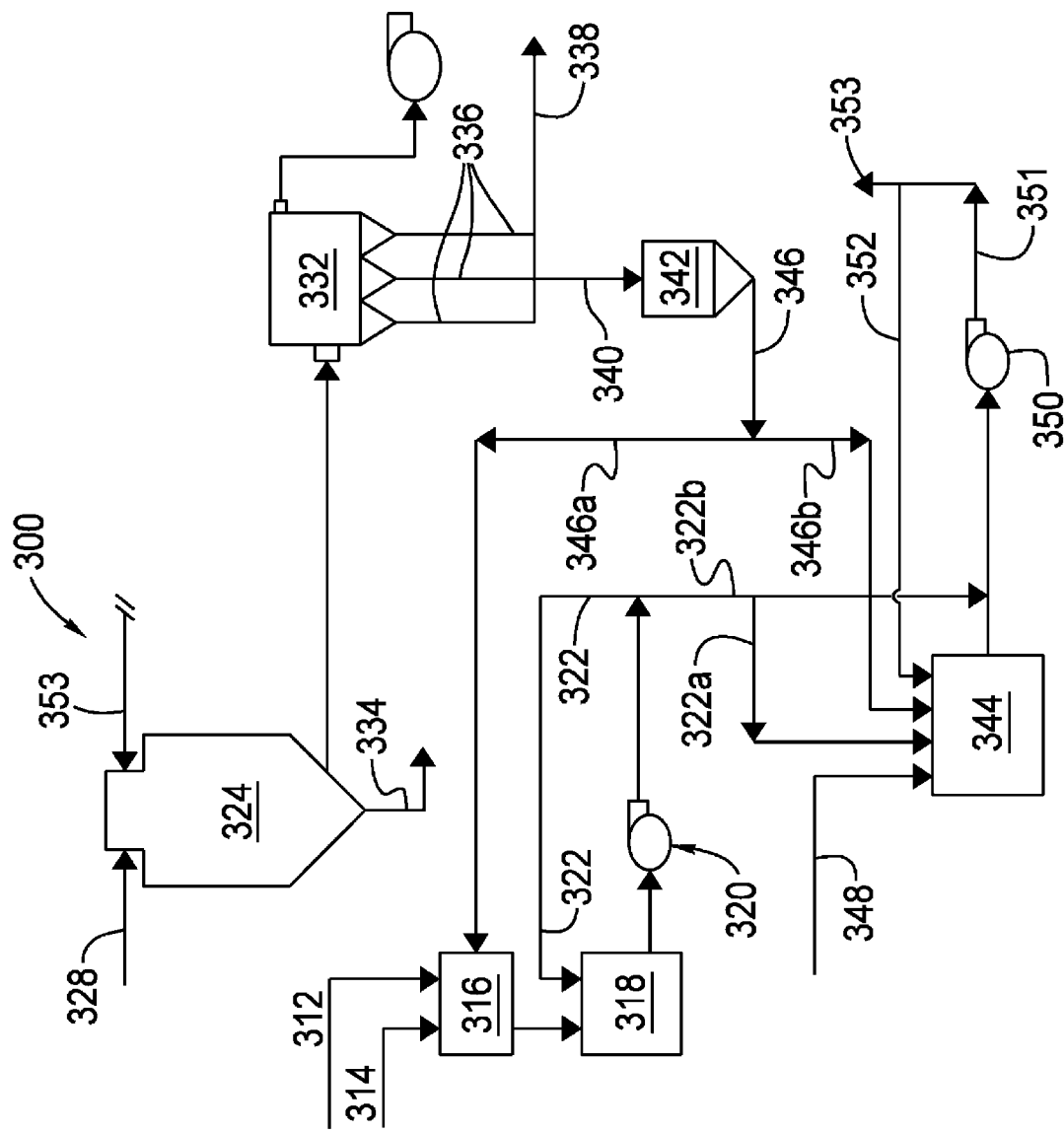
FIG. 4 schematically illustrates a DFGD system.

Another DFGD system is shown in FIG. 4 and is generally designated by the reference numeral 300. DFGD system 300 is similar to the above-described system 110. One difference between the DFGD system 300 and the system 110 is a portion of the particulate transferred from the storage silo 342 to the feed tank 344 is transferred to the slaker 316 via a conduit 346a. The remaining portion of the particulate from the storage silo 342 is transferred to the feed tank 344 via a conduit 346b. The particulate is mixed with water added to the feed tank via conduit 348 and a portion of the slaked lime slurry via the conduit 322a. The mixture formed in the feed tank 344 exits the feed tank to a pump 350, wherein a portion of the mixture is sent to the spray dryer via a conduit 353 where it is atomized. A separate portion of the mixture is recycled back to the feed tank 344 via conduit 352 where it is mixed with the water, slaked lime slurry and particulate.

While the invention has been described with reference to various exemplary embodiments, it will be understood by those skilled in the art that various changes may be made and equivalents be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing lime consumption in DFGD systems comprising:
   forming a slaked lime slurry in a slaker;
   removing at least a portion of the slaked lime slurry from the slaker;
   adding water to the removed portion of the slaked lime slurry prior to providing the removed portion of the slaked lime slurry to a spray dryer;
   atomizing the slaked lime slurry in the spray dryer;
   reacting a flue gas stream with the atomized slaked lime slurry in the spray dryer causing sulfur dioxide absorption into droplets forming the atomized slaked lime slurry, and formation of calcium sulfite and calcium sulfate particulate; and
   collecting at least a portion of the substantially dry particulates from the spray dryer and flue gas using a filter, prior to being mixed with water and lime in the slaker during a slaking operation so that unreacted lime in the particulates is used in forming said slaked lime slurry.

2. A method for reducing lime consumption in DFGD systems as defined by claim 1 further comprising:
   storing slaked lime slurry from the slaker in a storage tank prior to use in the spray dryer.

3. A method for reducing lime consumption in DFGD systems as defined by claim 1, further comprising:
   collecting at least a portion of the substantially dry particulates in a storage receptacle.

4. A method for reducing lime consumption in DFGD systems as defined by claim 3, further comprising:
   combining in a feed tank the particulates from the storage receptacle, water and slaked lime to form a mixture thereof.

5. A method for reducing lime consumption in DFGD systems as defined by claim 4, further comprising:
   atomizing the mixture in the spray dryer.

6. A method for reducing lime consumption in DFGD systems as defined by claim 4, further comprising:
   storing at least a portion of the mixture in the feed tank.

7. A method for reducing lime consumption in DFGD systems as defined by claim 1, wherein at least a portion of the substantially dry particulate is either directly used in the slaker, or is stored in a storage receptacle prior to use in said slaker.

8. A method for reducing lime consumption in DFGD systems as defined by claim 7, wherein said storage receptacle is a silo.

9. A method for reducing lime consumption in DFGD systems, said method comprising:
   forming a slaked lime slurry in a slaker;
   removing at least a portion of the slaked lime slurry from the slaker and providing the removed portion of the slaked lime slurry to a storage tank;
   adding water to the removed portion of the slaked lime slurry prior to providing the removed portion of the slaked lime slurry to a spray dryer;
   atomizing the slaked lime slurry in the spray dryer;
   reacting a flue gas stream with the atomized slaked lime slurry in the spray dryer thereby causing sulfur dioxide absorption into droplets of the atomized slaked lime slurry, and sulfur dioxide formation of calcium sulfite and calcium sulfate particulates; and
   collecting with a filter at least a portion of substantially dry particulates for storage in a storage receptacle prior to mixture with water and lime in the slaker so that unreacted lime in the particulate is used in forming the slaked lime slurry.

10. A system for dry flue gas desulfurization comprising:
    a slaker operable with lime and water to form a slaked lime slurry;
    a storage tank in fluid communication with the slaker for receiving and storing the slaked lime slurry;
    an atomizer in a spray dryer in fluid communication with the storage tank for receiving and atomizing the slaked lime slurry within the spray dryer, the spray dryer also in fluid communication with a gas source from which a flue gas stream flows into the spray dryer;
    a filter in fluid communication with the spray dryer for collecting at least a portion of particulates from the flue gas and atomized slurry, the particulates being substantially dry; and
    a storage receptacle in fluid communication with both the filter for storage of at least a portion of said filtered particulates, and the slaker in which at least a portion of the filtered particulates is used.

* * * * *